(12) United States Patent
Winter et al.

(10) Patent No.: US 7,197,233 B1
(45) Date of Patent: Mar. 27, 2007

(54) METHOD OF MARKING DIGITAL DATA

(75) Inventors: Marco Winter, Hannover (DE);
Harald Schiller, Hannover (DE);
Seong-Jin Moon, Seoul (KR);
Young-Nam Oh, Seongnam-Shi (KR);
Sung-Wook Park, Seoul (KR)

(73) Assignees: Deutsche Thomson-Brandt GmbH, Villingen-Schwenningen (DE); Samsung Electronics Co., Ltd., Suwon (KR)

( * ) Notice: Subject to any disclaimer, the term of this patent is extended or adjusted under 35 U.S.C. 154(b) by 0 days.

(21) Appl. No.: 10/009,223

(22) PCT Filed: Apr. 25, 2000

(86) PCT No.: PCT/EP00/03680

§ 371 (c)(1),
(2), (4) Date: Jul. 15, 2002

(87) PCT Pub. No.: WO00/68949

PCT Pub. Date: Nov. 16, 2000

(30) Foreign Application Priority Data

May 7, 1999 (EP) .................................. 99109065
May 17, 1999 (EP) .................................. 99109670

(51) Int. Cl.
*H04N 5/91* (2006.01)
(52) U.S. Cl. .................. 386/95; 386/125; 386/126; 386/45

(58) Field of Classification Search ........ 386/125–126, 386/45, 95
See application file for complete search history.

(56) References Cited

U.S. PATENT DOCUMENTS

| 6,088,304 | A | * | 7/2000 | Aramaki et al. | 369/30.09 |
|---|---|---|---|---|---|
| 6,654,542 | B1 | * | 11/2003 | Winter | 386/95 |
| 6,763,179 | B1 | * | 7/2004 | Park et al. | 386/95 |
| 6,907,464 | B1 | * | 6/2005 | Park et al. | 709/231 |

FOREIGN PATENT DOCUMENTS

| EP | 833 337 A2 | 4/1998 |
|---|---|---|
| EP | 903 744 A2 | 3/1999 |
| EP | 986 062 A1 | 3/2000 |
| EP | 1021048 A2 | 7/2000 |
| WO | 99/38166 | 7/1999 |

OTHER PUBLICATIONS

Search Report.

\* cited by examiner

*Primary Examiner*—Thai Q. Tran
*Assistant Examiner*—Daquan Zhao
(74) *Attorney, Agent, or Firm*—Joseph J. Laks; Robert B. Levy; Jorge Tony Villabon

(57) ABSTRACT

A method is proposed introducing a temporarily erased flag in order to indicate a cell to be temporarily erased. In addition, necessary time stamps are set for complete Stream Object Units to be erasable to enable on the fly permanent erasure without any additional view into the streams or quick permanent erasure. Advantageously the temporarily erasure can also be completely withdrawn.

8 Claims, 5 Drawing Sheets

METHOD OF MARKING DIGITAL DATA

This application claims the benefit under 35 U.S.C. § 365 of International Application PCT/EP00/03680, filed Apr. 25, 2000, which claims the benefit of European Patent Application No. 99109065.5, filed May 7, 1999 and European Patent Application No. 99109670.2, filed May 17, 1999.

The invention relates to a method for temporarily erasing a part of a program of a digital data stream representing video or audio information.

BACKGROUND OF THE INVENTION

Field of the Invention

In bitstream recording one is free to subdivide the bitstream into sub-units of more regular structure. Presentation data in DVDs (digital video or versatile disc) is organised into units called Video Object Unit, denoted VOBU, e.g. in the DVD Specifications for Video Recording. VOBUs have a variable size (data amount measured in number of sectors), but have also a variable duration (measured in number of video fields).

For data retrieval from the disc the DVD Specifications for Video Recording foresees a 'VOBU map' which is a table where for every VOBU in a Recording the length in sectors and the duration in fields is entered.

SUMMARY OF THE INVENTION

It is one object of the invention to disclose a method for temporarily erasing a part of a program to enable on the fly permanent erasure without any additional view into the streams or complete withdrawal of the temporarily erasure.

According to the invention, this object is achieved by means of the features specified in main claims. Advantageous designs and developments are specified in subclaims.

The directory and file structure of DVD Stream Recording is organized in Stream Data and Navigation Data of the DVD Stream Recording as follows:

Any DVD Streamer Device has certain requirements to store its own, Streamer-specific navigation data on the disc. These data are solely for helping the retrieval of recorded data; they need not to be understood or even be visible to any outside Application Device.

Any DVD Streamer Device needs to communicate with the Application Device it is connected to. This communication should be straightforward, and as universal as possible, so that the maximum possible range of applications—both today and future—can be connected to the Streamer. The Navigation Data to support such communication must be understandable by the Streamer as well as by the Application Device; they will be called "Common navigation data" in the following.

The Streamer Device should offer to the connected Application Device a means for storing its own private data of any desired kind. The Streamer needs not to understand any of the content, internal structure, or meaning of this "Application-specific navigation data".

Navigation data is provided to control the recording, playing back, and editing of any bitstreams that are recorded. In DVD Stream Recording, Navigation Data is called "Streamer Information" (STRI). STRI consists of six kinds of information tables, namely Streamer Video Manager Information (STR_VMGI), Stream File Information Table (SFIT), Original Program Chain Information (ORG_PGCI), User Defined Program Chain Information (UD_PGCI), Text Data Manager (TXT_DT_MG), and Application Private Data Manager (APD_MG).

The Stream File Information Table contains the information where on the recording media the stream data are recorded. The Original PGC Information has the function of a play list, which contains all takes which were made. A take is defined as containing the information between a start and a stop action in the sequence of recording or also called one program of the ORG_PGCI. In addition, a Stream Object (SOB) contains a full take or part of a take. With both tables the data can be retrieved for playback.

The User Defined PGC Information contains information, which are defined by a user.

In order to address more precisely a program contains one or more cells. A cell points to Stream Object Units (SOBU) and to each SOBU an Incremental Application Packet Arrival Time (IAPAT) is assigned.

According to the invention a temporarily erased flag is introduced in order to indicate a cell to be temporarily erased. In addition necessary time stamps are set in a special way to enable on the fly permanent erasure without any additional view into the streams or quick permanent erasure. Advantageously the temporarily erasure can be withdrawn completely also.

For a permanent erasure of temporarily erased (TE) cells an adaptation of Stream Cell Start Application Packet Arrival Time (SC_S_APAT) and Stream Cell End Application Packet Arrival Time (SC_E_APAT) is needed. In order to realize this during recording a calculation must be performed without any additional views into the stream. This will be realized by following definition of TE cells:

The TE cell covers a part of a SOB. SC_S_APAT and SC_E_APAT of a TE cell are set in a way that only all complete SOBUs, covered by the TE cell, are marked, i.e. following rules define SC_S_APAT and SC_E_APAT of a TE cell. They must be completely fulfilled:

SC_S_APAT is equal to the Application Packet Arrival Time (APAT) of the first application packet of an SOBU and if the TE cell covers the start of the SOB, then SC_S_APAT is equal to the APAT of the first application packet of the first SOBU of the SOB.

In all other cases

SC_S_APAT is equal to or greater than the APAT of the first application packet of the TE part and SC_S_APAT is as close as possible to the APAT of the first application packet of the TE part.

SC_E_APAT is equal to the APAT of the first application packet of an SOBU and if the TE cell covers the end of the SOB, then SC_E_APAT is equal to the APAT of the first application packet of the SOBU following immediately the last SOBU of this SOB.

In all other cases

SC_E_APAT is equal to or less than the APAT of the application packet which follows immediately the last application packet of the TE part and SC_E_APAT is as close as possible to the APAT of the last application packet of the TE part.

Note 1: The definition above assumes that an SOBU exists after the last SOBU of the SOB. This SOBU doesn't exist really.

Therefore, the following rules define the APAT of the first application packet of the SOBU following immediately the last SOBU of this SOB:

this APAT is greater than the APAT of the last application packet of this SOB and the 18 (=MTU_SHFT) least significant bits of this APAT value are set to zero and this APAT value is as close as possible to the last application packet of the SOB.

Note 2: TE part means all application packets of an SOB which are not part of the normal cells and which are contiguous on the stream, i.e. no breaks via normal cells. The boundaries of TE parts are normal cells or SOB boundaries. Therefore, each TE part contains one TE cell.

Note 3: SC_E_APAT may be less than SC_S_APAT. The TE part contains complete SOBUs only in the case SC_S_APAT<SC_E_APAT.

Note 4: For small SOBUs the SC_S_APAT and the SC_E_APAT will be set by the definition above, so that the streamer is able to recognize whether the TE part is only inside one SOBU (SC_S_APAT>SC_E_APAT) or the TE part starts in one SOBU and ends in the following SOBU (SC_S_APAT=SC_E_APAT). Only for the (normal) case, that the TE part covers complete SOBUs SC_S_APAT will be less than SC_E_APAT.

As a first alternative it is proposed:

| Stream Cell General Information (SC_GI) | | |
|---|---|---|
| | Contents | Number of Bytes |
| | reserved | 1 |
| (1) C_TY | Cell Type | 1 |
| (2) SC_EPI_Ns | Number of Entry Point Information | 2 |
| (3) SOB_N | Stream Object number | 2 |
| (4) SC_S_APAT | Stream Cell Start APAT | 6 |
| (5) SC_E_APAT | Stream Cell End APAT | 6 |
| | Total | 18 |

(1) C_TY

Describes the Cell Type of this Stream Cell.

C_TY1 ... '010b' shall be described for all Stream Cells.

TE ... '0b': This Cell is in the "Normal" state.

'1b': This Cell is in "Temporarily Erased" state.

Preferably C_TY1 is represented by the first MSBs followed by the TE bits. The remaining LSBs are reserved.

(2) SC_EPI_Ns

Describes the number of Entry Point Information contained in this SCI.

(3) SOB_N

Describes the number of the SOB to which this Cell refers.

(4) SC_S_APAT

Describes the Start Application Packet Arrival Time (Start APAT) of this Stream Cell in DVD Stream Recording's PAT Describing Format.

If this cell is a TE cell without a previous TE cell of the same SOB, then this SC_S_APAT describes the APAT of the first Application Packet of the first SOBU, the beginning of which is contained in or after the TE Cell.

(5) SC_E_APAT

For a "Normal" Cell, this describes the End Application Packet Arrival Time (End APAT) of this Stream Cell in DVD Stream Recording's PAT Describing Format.

For a "Temporarily Erased" Cell, this describes the APAT of the first Application Packet of that SOBU which contains the Application Packet immediately following the TE Cell.

The requirements for the temporary erasure:

1. Any TE part of a stream shall be completely reconstructable.
2. The start and end location marks of the TE parts shall be time based with APAT precision (note: the consumer doesn't know anything about SOBs, SOBUs or MAPLs).
3. During a recording the TE parts shall be permanently erasable without any view into the stream (real time recycling).

The realization of these requirements is done by a TE flag inside the cells of the original PGCs. This flag indicates cells which are temporarily erased.

A TE process changes the ORG_PGCI. The UD_PGCI and the SFI content won't be changed. The main action is done inside the program #j. The temporary erasure will be done by separating the cells of the program #j into the parts which covers the normal stream part (not erased) and the TE part.

After the reconstruction the complete Nav. Data is completely identical with the state before the temporary erasure.

Rules for SC_S_APAT and SC_E_APAT for Normal Cells

The normal cells point into its assigned SOB, i.e. if SC_E_APAT is equal to SOB__APAT of its assigned SOB, then this cell ends with the last application packet of its assigned SOB.

The nomenclature to define SC_S_APAT and SC_E_APAT is as follows:

1. cell #k shall denote the normal cell
2. $SC\_S\_APAT_k$ and $SC\_E\_APAT_k$ shall denote the start and end time of cell #k
3. SOB_N(k) shall denote the assigned SOB number of cell #k.

The definition of SC_S_APAT and SC_E_APAT of normal cells:

1. $SOB\_S\_APAT_{SOB\_N(k)} \leq SC\_S\_APAT_k \leq SC\_E\_APAT_1 \leq SOB\_E\_APAT_{SOB\_N(k)}$
2. $SC\_S\_APAT_k$ is equal to the APAT of the application packet inside SOB #SOB_N(k) which represents the first application packet of cell #k
3. $SC\_E\_APAT_k$ is equal to the APAT of the application packet inside SOB #SOB_N(k) which represents the last application packet of cell #k Rules for SC_S_APAT and SC_E_APAT for TE Cells The information stored in the TE cells shall be defined in a way that the original state of the program is 100% reconstructable and that the by the TE part completely covered SOBUs are indicated (this is demanded in order to be able to reuse complete SOBUs of TE parts on the fly during recording, i.e. without any view into the stream)

The nomenclature to define SC_S_APAT and SC_E_APAT is as follows:

cell #k shall denote the TE cell $SC\_S\_APAT_k$ and $SC\_E\_APAT_k$ shall denote the start and end time of cell #k SOB_N(k) shall denote the assigned SOB number of cell #k.

The definition of SC_S_APAT and SC_E_APAT of TE cells:

1. if the TE part starts with the first Application Packet of a SOBU or the TE part contains the start of the SOB, then SC_S_APAT is the APAT of the first Application Packet of that SOBU which contains the first Application Packet of the TE part.
2. In all other cases:
   2.1 If k>1 and cell #k−1 is a TE cell of the SOB #SOB_N(k), then
   $SC\_S\_APAT_k$ is the APAT of the first Application Packet of this TE part.
   2.2 In all other cases: $SC\_S\_APAT_k$ is equal to the APAT of the first Application Packet of that SOBU which follows immediately the SOBU containing the first Application Packet of the TE part.
3. $SC\_E\_APAT_k$ is equal to the APAT of the first Application Packet of that SOBU which contains the Application Packet immediately following the TE part.

Note 1: The definition above for SC_S_APAT and SC_E_APAT assumes that an Application Packet exists after the last Application Packet of the SOB. This Application Packet doesn't exist really. Therefore, the following rules define the APAT of the Application Packet following immediately the last Application Packet of this SOB:

this APAT is an integer multiple of the IAPAT Time Unit and this APAT is greater than the APAT of the last Application Packet of this SOB and this APAT is as close as possible to the last Application Packet of the SOB and this APAT is an APAT of the first Application Packet of a SOBU Note 2: TE part means all application packets of an SOB which are not part of the normal cells and which are contiguous on the stream, i.e. no breaks via normal cells. The boundaries of TE parts are either normal cells, other TE cells or SOB boundaries. Therefore, each TE part contains one TE cell.

Note 3: SC_E_APAT may be less than SC_S_APAT. The TE part contains complete SOBUs only in the case SC_S_APAT<SC_E_APAT. The 3 possible cases of SC_S_APAT and SC_E_APAT of an TE cell:

1) SC_S_APAT<SC_E_APAT
There is at least one complete SOBU inside the TE part of this TE cell. All complete SOBUs of this TE part can be permanently erased (e.g. during recording).

2) SC_S_APAT=SC_E_APAT
There is no complete SOBU inside the TE part of this TE cell. But the TE part has Application Packets in 2 SOBUs. A permanent erasure would split the assigned SOB between these 2 SOBUs into 2 SOBs. I.e. the resulting 2 SOBs doesn't share any SOBU.

3) SC_S_APAT>SC_E_APAT
There is no complete SOBU inside the TE part of this TE cell. The TE part has Application Packets only in 1 SOBU. A permanent erasure would split the assigned SOB inside one SOBU into 2 SOBs. I.e. the resulting 2 SOBs share a common SOBU.

So, each state is unambiguous and contains a lot of information about the location of the cells inside the stream.

As a second alternative it is proposed:

| Stream Cell General Information (SC_GI) | | |
|---|---|---|
| | Contents | Number of Bytes |
| | reserved | 1 |
| (1) C_TY | Cell Type | 1 |
| (2) SC_EPI_Ns | Number of Entry Point Informations | 2 |
| (3) SOB_N | Stream Object number | 2 |
| (4) SC_S_APAT | Stream Cell Start APAT | 6 |
| (5) SC_E_APAT | Stream Cell End APAT | 6 |
| if (TE == '10b') { | | |
| (6) ERA_S_APAT | Erase Start APAT | 6 |
| (7) ERA_E_APAT | Erase End APAT | 6 |
| | Total | 18 or 30 | with:
(1) C_TY
Describes the Cell Type of this Stream Cell.
C_TY1 ... '010b' shall be described for all Stream Cells.
TE ... '00b': This Cell is in the "Normal" state.
'01b': This Cell is in "Temporarily Erased" state; and this Cell starts after the first Application Packet of a SOBU and ends before the last Application Packet of the same SOBU.
'10b': This Cell is in "Temporarily Erased" state; and this Cell contains at least one SOBU border (first or last Application Packet of a SOBU). ERA_S_APAT and ERA_E_APAT exist for this Cell.
(2) SC_EPI_Ns
Describes the number of Entry Point Information contained in this SCI.
(3) SOB_N
Describes the number of the SOB to which this Cell refers.
(4) SC_S_APAT
Describes the Start Application Packet Arrival Time (Start APAT) of this Stream Cell in DVD Stream Recording's PAT Describing Format.
(5) SC_E_APAT
Describes the End Application Packet Arrival Time (End APAT) of this Stream Cell in DVD Stream Recording's PAT Describing Format.
(6) ERA_S_APAT
For a "Temporarily Erased" Cell, this describes the APAT of the first Application Packet of the first SOBU, the beginning of which is contained in the TE Cell or after that Cell.
(7) ERA_E_APAT
For a "Temporarily Erased" Cell, this describes the APAT of the first Application Packet of that SOBU which contains the Application Packet immediately following the TE Cell.

The SCI definition of the ORG_PGCI contains a TE flag inside C_TY (Cell Type) of its SC_GI. This TE flag indicates whether this is an TE cell (TE flag is set) or a normal cell (TE flag is cleared).

BRIEF DESCRIPTION OF THE DRAWINGS

Embodiments of the invention are described with reference to the accompanying drawing, which shows in.

DETAILED DESCRIPTION

Exemplary embodiments of the invention are explained in more detail in the following description.

Figure 1:
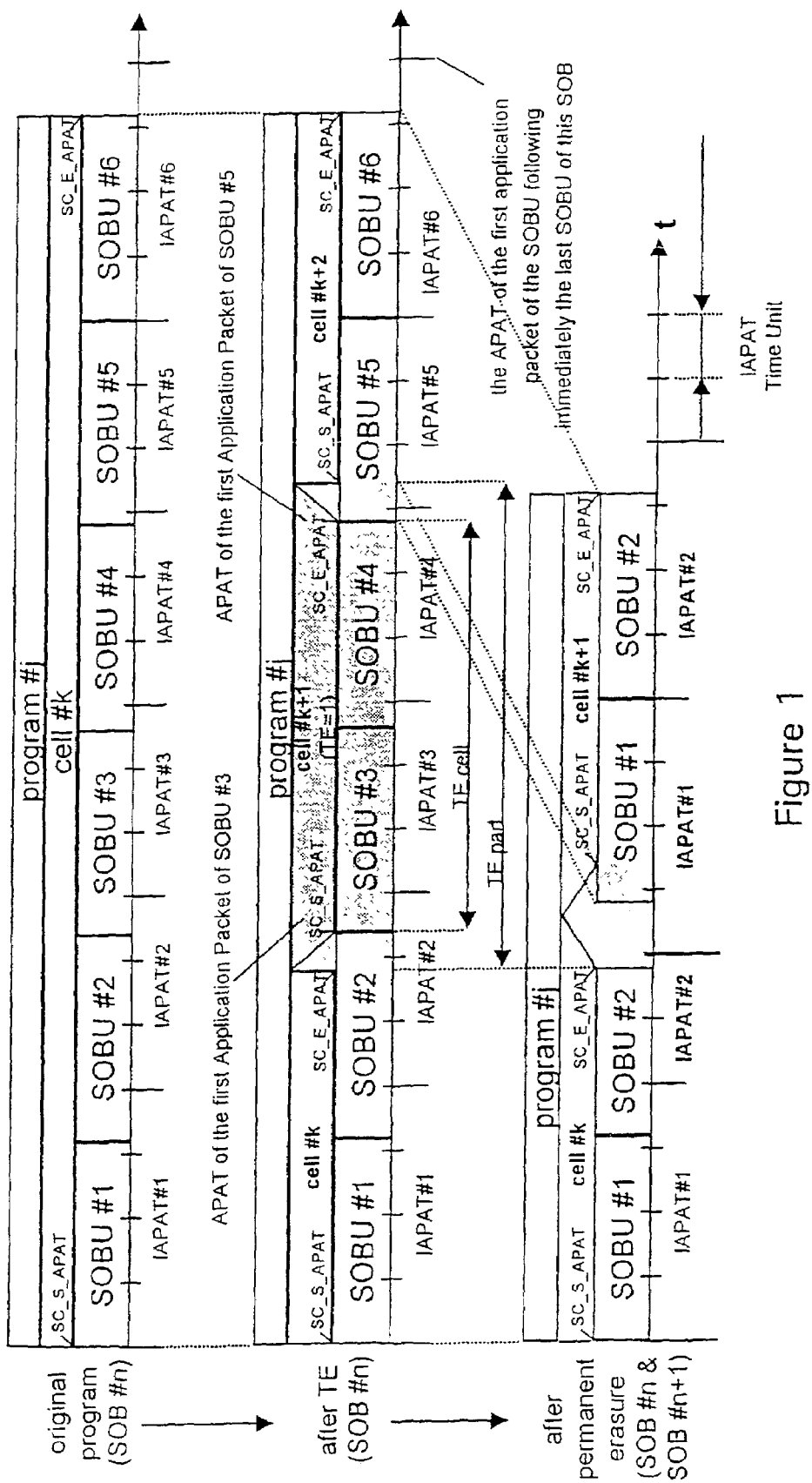
FIG. 1 TE and Permanent Erasure seen from SOBU level.

In FIG. 1 TE and Permanent Erasure seen from SOBU level is shown. In the upper part of the drawing labeled "original program" a program #j contains one cell #k with one SC_S_APAT and one SC_E_APAT. The cell #k contains several SOBUs from SOBU #1 to SOBU #6. To each SOBU an Incremental Application Packet Arrival Time (IAPAT) is assigned.

In the middle part labeled "after TE" the gray marked part of program #j is marked for example by a user or based on given parameter as being temporarily erased. The program #j contain now 3 cells from cell #k to cell #k+2. Cell #k and cell #k+2 can be played back, while on cell #k+1 an erased flag is set. Cell #k+1 contains a TE part, which was decided to be erased and a smaller TE cell, which can be used for later recording.

To cell #k a new SC_E_APAT and to cell #k+2 a new SC_S_APAT are assigned. To enable on-the-fly erasure SC_E_APAT SC_S_APAT for cell #k+1 have to be calculated by the following rules:

SC_S_APAT is equal to the Application Packet Arrival Time (APAT) of the first application packet of an SOBU and if the TE cell covers the start of the SOB, then SC_S_APAT is equal to the APAT of the first application packet of the first SOBU of the SOB.

In all other cases

SC_S_APAT is equal to or greater than the APAT of the first application packet of the TE part and SC_S_APAT is as close as possible to the APAT of the first application packet of the TE part.

SC_E_APAT is equal to the APAT of the first application packet of an SOBU and if the TE cell covers the end of the SOB, then SC_E_APAT is equal to the APAT of the first application packet of the SOBU following immediately the last SOBU of this SOB.

In all other cases

SC___APAT is equal to or less than the APAT of the application packet which follows immediately the last application packet of the TE part and SC_E_APAT is as close as possible to the APAT of the last application packet of the TE part.

The program #j contains now 3 cells from cell #k to cell #k+2. Cell #k and cell #k+2 can be played back, while on cell #k+1 an erased flag is set.

In the lower part labeled "after permanent erasure" the program #j contains only two cells, that are cell #k and cell #k+1 (former cell #k+2), while the TE cell of the former cell #k+1 was erased.

The SOBUs of each cell #k and cell #k+1 have been renumbered and also the assigned IAPATs. As shown in this example a small area marked in gray remains in the bit stream, which cannot be used for recording of further data.

After permanent erasure the Stream File Information, the Original PGC Information and the User Defined PGC Information are updated.

Description and Requirements for User Operations Related to Temporary Erasure

Figure 2:
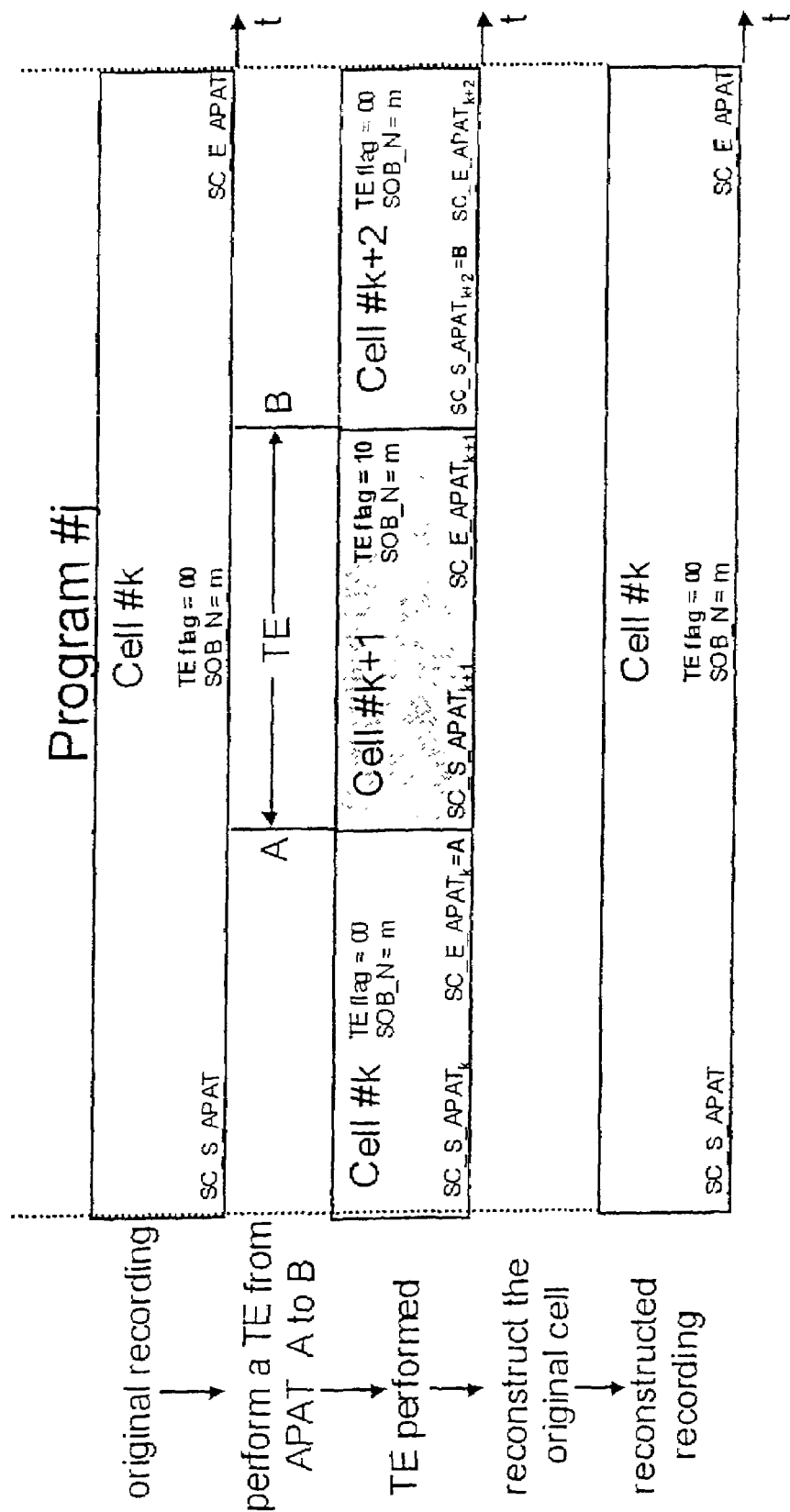
FIG. 2 The principle of temporary erasure including reconstruction.

The invention handles two kinds of erasure. The first one is to permanently erase parts of a stream. The other one is to temporarily erase (TE) parts of a stream. FIG. 2 shows the principle of temporary erasure including reconstruction.

The requirements for the temporary erasure:
1. Any TE part of a stream shall be completely reconstructable.
2. The start and end location marks of the TE parts shall be time based with APAT precision because the consumer doesn't know anything about SOBs, SOBUs or MAPLs.
3. During a recording the TE parts shall be permanently erasable without any view into the stream that means real time recycling.

The realization of these requirements is done by a TE flag inside the cells of the original PGCs. This flag indicates cells which are temporarily erased.

Figure 3:
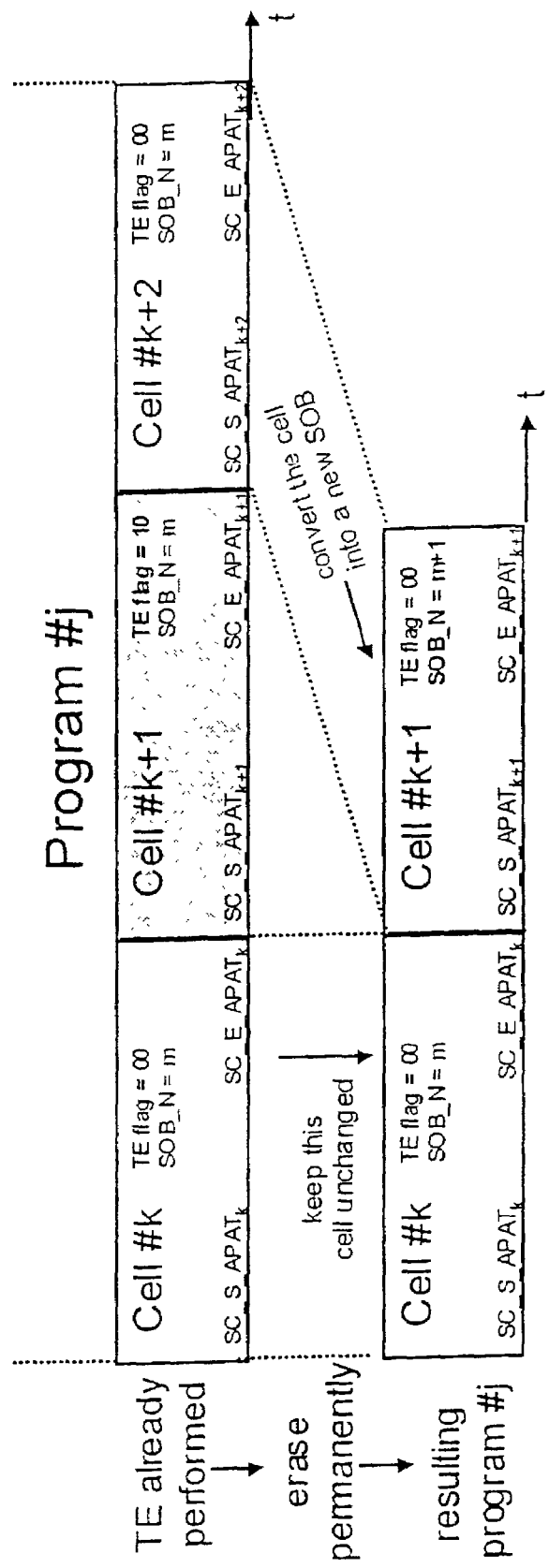
FIG. 3 principle of a permanent erasure of a TE part.

FIG. 3 shows the principle of a permanent erasure of a TE part.

A TE process changes the ORG_PGCI. The UD_PGCI and the SFI content won't be changed. The main action is done inside the program #j. The temporary erasure will be done by separating the cells of the program #j into the parts which covers the normal stream part—not erased—and the TE part.

After the reconstruction the complete Navigation Data is completely identical with the state before the temporary erasure.

Rules for SC_S_APAT and SC_E_APAT for Cells

The normal and the TE cells point into its assigned SOB, i.e. if SC_E_APAT is equal to SOB_E_APAT of its assigned SOB, then this cell ends with the last application packet of its assigned SOB.

The nomenclature to define SC_S_APAT and SC_E_APAT is as follows:
1. cell #k shall denote the normal or TE cell
2. $SC\_S_{-1}\ APAT_k$ and $SC\_E\_APAT_k$ shall denote the start and end time of cell #k
3. SOB_N(k) shall denote the assigned SOB number of cell #k.

The definition of SC_S_APAT and SC_E_APAT of normal and TE cells:
1. $SOB\_S\_APAT_{SOB\_}N(k); \leq SC\_S\_APAT, \leq SC\_E\_APAT. \leq SOB\_E\_APAT_{SOB\_}N(k)$
2. SC_S_APAT is equal to the APAT of the application packet inside SOB #SOB_N(k) which represents the first application packet of cell #k
3. $SC\_E\_APAT_1$ is equal to the APAT of the application packet inside SOB #SOB_N(k) which represents the last application packet of cell #k Rules for ERA_S_APAT and ERA_E_APAT for TE Cells Only when a TE cell covers at least one SOBU border—start or end application packet of a SOBU—, then this TE cell contains ERA_S_APAT and ERA_E_APAT. These two APATs mark the SOBUs which are completely covered by a TE cell. This information is useful to reuse the TE SOBUs on-the-fly, i.e. without any view into the stream.

The definition of ERA_S_APAT and ERA_E_APAT:
1. if SC_S_APAT is the first Application Packet of a SOBU or the TE Cell contains the start of the SOB, then ERA_S_APAT is equal to the APAT of the first Application Packet of that SOBU which contains the Application Packet with the APAT SC_S_APAT.
2. In all other cases
ERA_S_APAT is equal to the APAT of the first Application Packet of that SOBU which follows immediately the SOBU containing the Application Packet with the APAT SC_S_APAT.
3. ERA_E_APAT is equal to the APAT of the first Application Packet of that SOBU which contains the Application Packet immediately following the TE Cell Note 1: The definitions above for ERA_S_APAT and ERA_E_APAT assume that an Application Packet exists after the last Application Packet of the SOB. This Application Packet doesn't exist really. Therefore, the following rules define the APAT of the Application Packet following immediately the last Application Packet of this SOB:

this APAT is an integer multiple of the IAPAT Time Unit and
this APAT is greater than the APAT of the last Application Packet of this SOB and
this APAT is as close as possible to the last Application Packet of the SOB and
this APAT is an APAT of the first Application Packet of a SOBU Note 2: ERA_S_APAT may be equal to ERA_E_APAT, i.e. no complete SOBU is covered by the TE cell. The TE cell contains complete SOBUs only for the case ERA_S_APAT<ERA_E_APAT. If even ERA_S_APAT is equal to ERA_E_APAT inside each TE cell of a TE cell chain, then between the TE cells are complete SOBUs.

Note 3: TE cells which start after the first application packet of a SOBU and ends before the last application packet of the same SOBU will have no ERA_S_APAT and no ERA_E_APAT.

Figure 4:
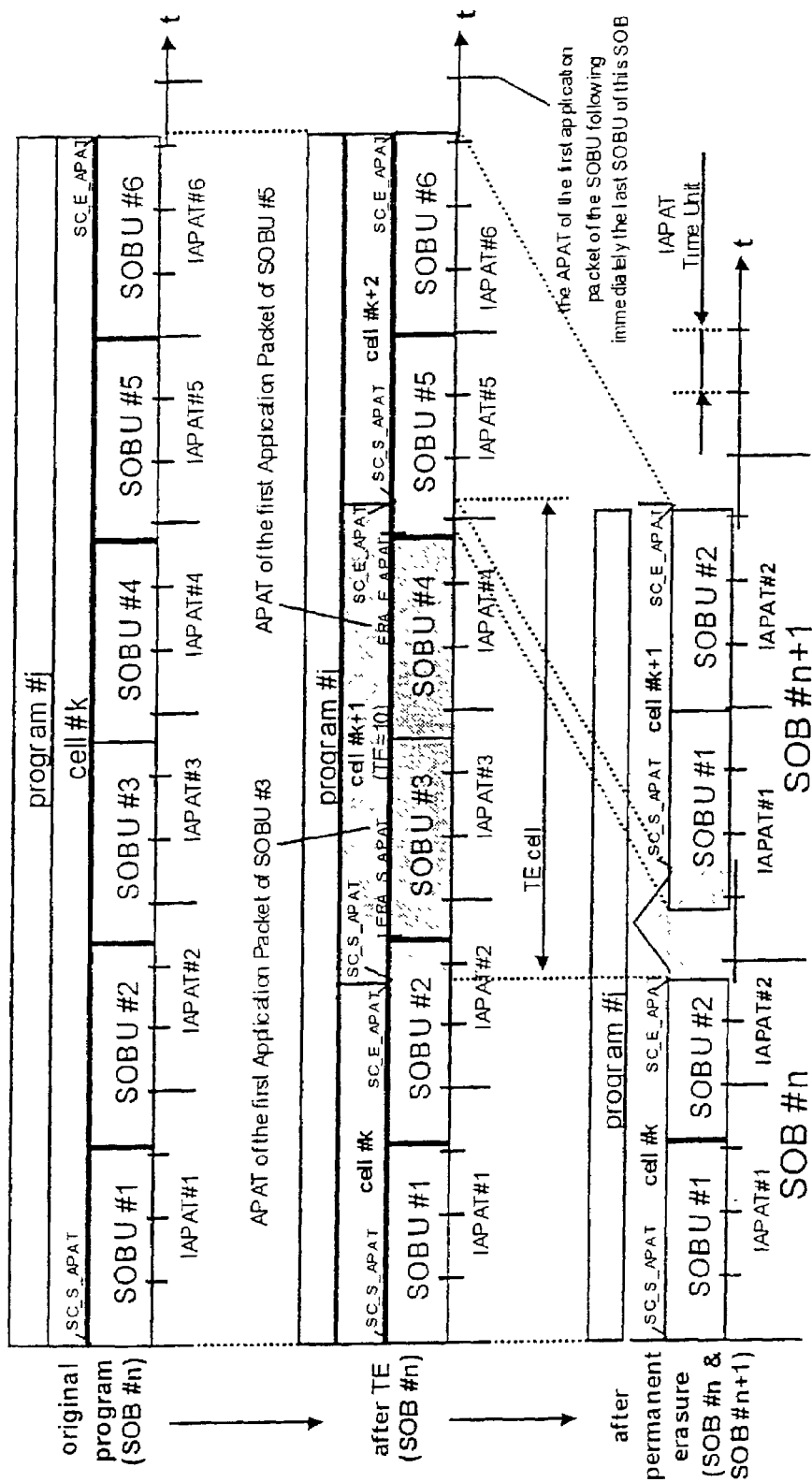
FIG. 4 Temporary erasure and subsequent permanent erasure.
Figure 5:
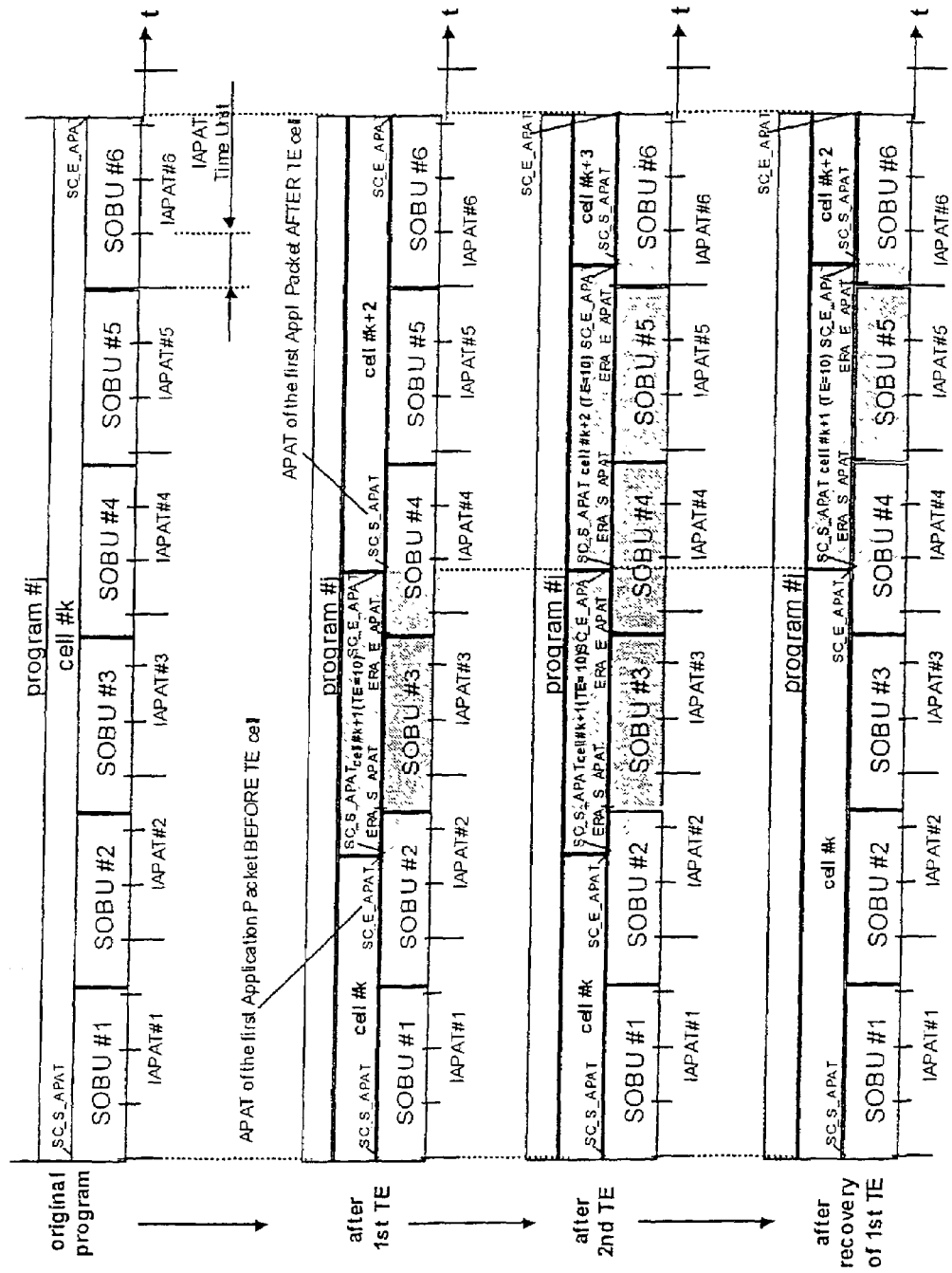
FIG. 5 TE and subsequent further TE and reconstruction of the first TE cell.

Following figures shall explain the definition of TE cells. FIG. 4 shows a temporary erasure with a subsequent permanent erasure of the Dust temporarily erased part. FIG. 5 shows a temporary erasure with a subsequent second temporary erasure behind the just temporarily erased part. After that, a reconstruction of the first TE part is shown.

The gray parts mark the not presentable (TE) parts of the stream. The dark gray parts mark the temporarily erased complete SOBUs.

Re-Use of TE Cells on-the-Fly During Recording

The TE cells contain 2 special APATs: ERA_S_APAT and ERA_E_APAT. The actual intention of these 2 APATs is to allow to reuse TE SOBUs during recording, i.e. when the disc becomes full during recording, then the streamer shall be able to permanently erase TE cells, in order to get new free SOBUs to continue the recording without any break. The APATs SC_S_APAT and SC_E_APAT of the TE cell aren't exact enough for this purpose, because a search via the MAPL results in 2 possible positions of the assigned SOBU (SOBU #m or SOBU #m+1). A search via the MAPL would require an additional search inside the stream. That's not possible in realtime. But, with ERA_S_APAT and ERA_E_APAT the exact SOBU position is locateable via the MAPL without any view into the stream.

What is claimed is:

1. Method for temporarily erasing a part of a program consisting of a digital data stream organized into one or more Stream Objects representing video or audio or other digital data information and original navigation data for facilitating management of the digital data stream recorded in a recording medium wherein the navigation data of the program contains one or more cells and the cells are logically linked with said Stream Objects by stream cell information, and said Stream Objects comprise one or more stream object units, (A) generating new navigation data of a corresponding Stream Object in case part of said Stream Object is intended to be temporarily erased, said navigation data are generated in such a way that the corresponding stream cell information of said navigation data is split depending on the coverage of said intended-to-be-deleted part of said Stream Object by taking following steps, (a1) If the part of the program to be temporarily erased covers neither the start of a current cell nor the end of said current cell, then said current cell is split into three parts
with a first part assigned to a first part of the Stream Object, which is displayable,
with a second part assigned to a second part of said Stream Object, which is temporarily erased and therefore not displayable, and
with a third part assigned to a third part of said Stream Object, which is displayable;

(a2) If the part of said program to be temporarily erased covers the start of said current cell but not the end of said current cell, then said current cell shall be split into two parts
with a first part assigned to a first part of said Stream Object, which is temporarily erased and therefore not displayable, and
with a second part assigned to a second part of said Stream Object, which is displayable;

(a3) If the part of said program to be temporarily erased does not cover the start of said current cell but the end of said current cell, then said current cell shall be split into two parts
with a first part assigned to a first part of a Stream Object, which is displayable, and
with a second part assigned to a second part of a Stream Object, which is temporarily erased and therefore not displayable;

(a4) If the part of said program to be temporarily erased covers the start and the end of said current cell, then said current cell representing said part of said Stream Object shall be changed from displayable to temporarily erased and therefore not displayable, (B) creating a link of the generated new navigation data with said Stream Object, (C) replacing original navigation data with generated new navigation data.

2. Method according to claim 1, including the following steps:
setting within the generated navigation data for temporarily erased cells a Stream Cell Start Application Packet Arrival Time and a Stream Cell End Application Packet Arrival Time,
whereby said Stream Cell Start Application Packet Arrival Time is equal to an Application Packet Arrival Time of the first application packet of a Stream Object Unit.

3. Method according to claim 2, including the following steps:
setting said Stream Cell Start Application Packet Arrival Time by the following rules:
if the part of said Stream Object, which is temporarily erased, covers the start of the Stream Object, then
said Stream Cell Start Application Packet Arrival Time is equal to the Application Packet Arrival Time of the first application packet of the first Stream Object Unit of the Stream Object;
if the part of said Stream Object, which is temporarily erased, does not cover the start of the Stream Object, then said Stream Cell Start Application Packet Arrival Time is equal to or greater than the Application Packet Arrival Time of first application packet of the temporarily erased cell and said Stream Cell Start Application Packet Arrival Time is as close as possible to the Application Packet Arrival Time of the first application packet of the temporarily erased cell;

said Stream Cell End Application Packet Arrival Time is equal to the Application Packet Arrival Time of the first application packet of a Stream Object Unit;

if the part of said Stream Object, which is temporarily erased, covers the end of the Stream Object, then said Stream Cell End Application Packet Arrival Time is equal to the Application Packet Arrival Time of the first application packet of the Stream Object Unit following immediately the last Stream Object Unit of this Stream Object;

if the part of said Stream Object, which is temporarily erased, does not cover the end of the Stream Object, then said Stream Cell End Application Packet Arrival Time is equal to or less than the Application Packet Arrival Time of the application packet which follows immediately the last application packet of the temporarily erased cell and said Stream Cell End Application Packet Arrival Time is as close as possible to the Application Packet Arrival Time of the last application packet of the temporarily erased cell.

4. Method according to claim 1, including the following steps:

setting within the generated navigation data for a part of said Stream Object, which is temporarily erased, an Erase Start Application Packet Arrival Time whereby said Erase Start Application Packet Arrival Time is equal to an Application Packet Arrival Time of the first application packet of a Stream Object Unit.

5. Method according to claim 4, including the following steps:

setting said Erase Start Application Packet Arrival Time by the following rules:

said Erase Start Application Packet Arrival Time is equal to the Application Packet Arrival Time of the first application packet of a Stream Object Unit;

if the part of said Stream Object, which is temporarily erased, covers the start of the Stream Object, then said Erase Start Application Packet Arrival Time is equal to the Application Packet Arrival Time of the first application packet of the first Stream Object Unit of the Stream Object;

if the part of said Stream Object, which is temporarily erased, does not cover the start of the Stream Object, then said Erase Start Application Packet Arrival Time is equal to or greater than the Application Packet Arrival Time of first application packet of the part of said Stream Object, which is temporarily erased, and said Erase Start Application Packet Arrival Time is as close as possible to the Application Packet Arrival Time of the first application packet of the part of said Stream Object, which is temporarily erased;

said Erase End Application Packet Arrival Time is equal to the Application Packet Arrival Time of the first application packet of a Stream Object Unit;

if the part of said Stream Object, which is temporarily erased, covers the end of the Stream Object, then said Erase End Application Packet Arrival Time is equal to the Application Packet Arrival Time of the first application packet of the Stream Object Unit following immediately the last Stream Object Unit of this Stream Object;

if the part of said Stream Object, which is temporarily erased, does not cover the end of the Stream Object, then said Erase End Application Packet Arrival Time is equal to or less than the Application Packet Arrival Time of the application packet which follows immediately the last application packet of the part of said Stream Object, which is temporarily erased.

6. Method according to claim 4, including the following steps:

setting within the generated navigation data for a part of said Stream Object, which is temporarily erased, an Erase End Application Packet Arrival Time whereby said Erase End Application Packet Arrival Time is equal to the Application Packet Arrival Time of the first application packet of a Stream Object Unit.

7. Method according to claim 6, including the following steps:

setting said Erase End Application Packet Arrival Time by the following rules:

said Erase End Application Packet Arrival Time is as close as possible to the Application Packet Arrival Time of the last application packet of the part of said Stream Object, which is temporarily erased.

8. Method according to claim 4, including the following steps:

setting within the generated navigation data or a part of said Stream Object, which is temporarily erased, a Stream Cell Start Application Packet Arrival Time and a Stream Cell End Application Packet Arrival Time, said Stream Cell Start Application Packet Arrival Time is equal to the Application Packet Arrival Time of the first application packet of the part of said Stream Object, which is temporarily erased, and said Stream Cell End Application Packet Arrival Time is equal to the Application Packet Arrival Time of the last application packet of the part of said Stream Object, which is temporarily erased.

* * * * *